Figure 1:
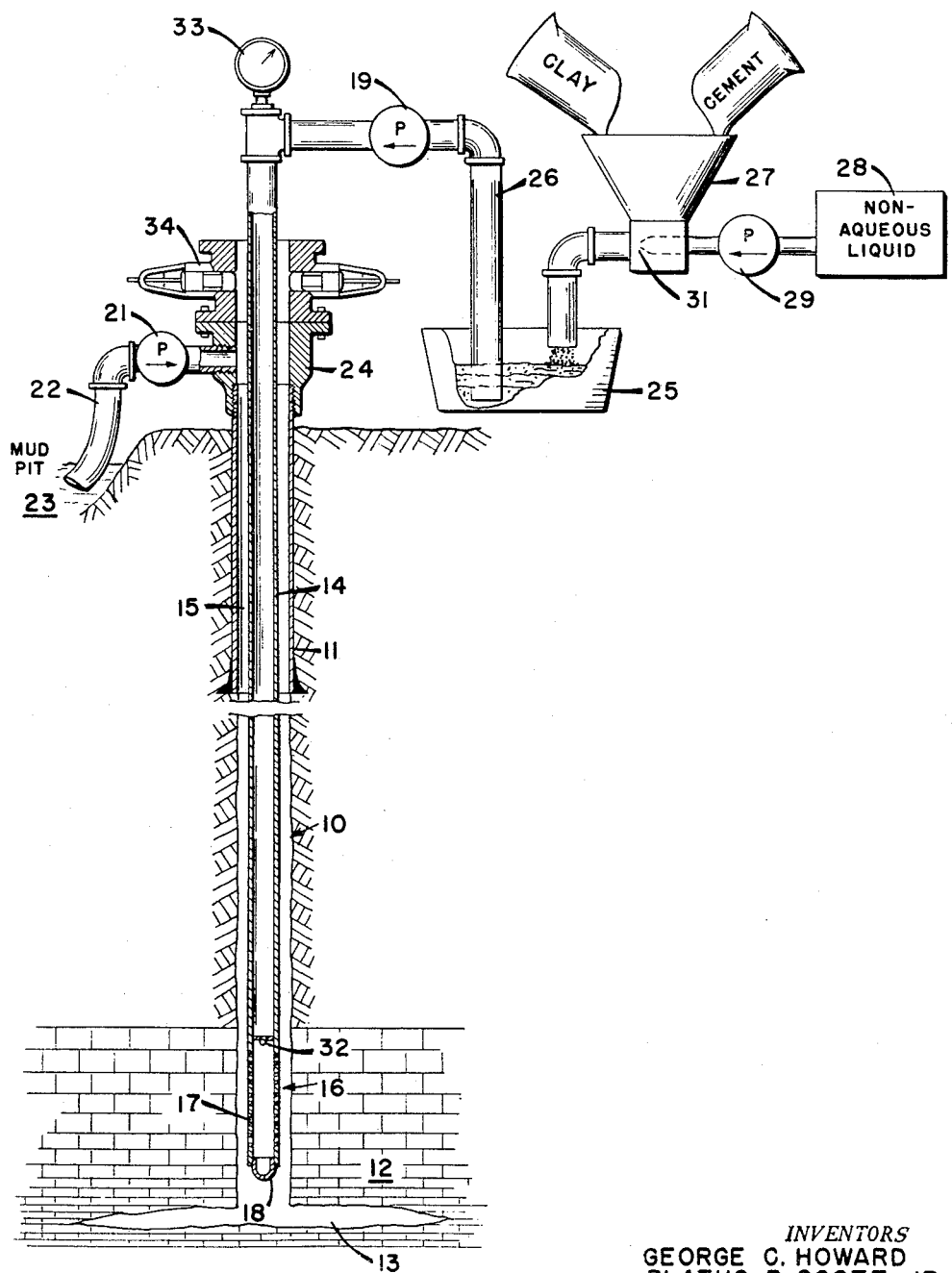

July 30, 1957

G. C. HOWARD ET AL 2,801,077

RECOVERY OF LOST CIRCULATION IN A DRILLING WELL

Filed Dec. 30, 1953

INVENTORS
GEORGE C. HOWARD
PLATHO P. SCOTT JR.
BY
*Goodwin*
ATTORNEY

United States Patent Office 2,801,077
Patented July 30, 1957

2,801,077
RECOVERY OF LOST CIRCULATION IN A DRILLING WELL

George C. Howard and Platho P. Scott, Jr., Tulsa, Okla., assignors to Pan American Petroleum Corporation, a corporation of Delaware Application December 30, 1953, Serial No. 401,196

10 Claims. (Cl. 255—1.8)

This invention relates to the recovery of lost returns in a well drilled by the rotary process. More particularly, this invention relates to the plugging of formations penetrated by a well during drilling to prevent the loss of whole mud to such formations and the loss of circulation in the well.

During the process of drilling deep oil and gas wells by the rotary process, the drilling fluid including both the liquid and solid phases, hereinafter referred to as whole drilling fluid, may be lost to a formation or what is often referred to as a lost circulation zone. Some formations have intergranular permeability in the range of 100 darcies or greater and such formations are known to permit the flow or loss of whole drilling fluid. That is, the finely divided solids such as colloids which are carried by the liquid phase are too small to bridge over the intergranular flow channels in these highly permeable formations and, therefore, the whole mud does not produce a filter cake on the well wall as is customary when formations having normal permeability are penetrated. Loss of whole drilling fluid to these highly permeable formations may be and quite often is prevented or overcome by addition to the drilling fluid of one or more of the so-called lost circulation recovery or bridging materials. These materials are divided generally into three classes as is well known in the art. They include the granular, fibrous, and lamellar types.

Whole drilling fluid in many instances is also lost in vugular or highly cavernous formations and in formations containing fractures, both natural and induced. In all these latter types of formations, the prevention of lost returns or the recovery of circulation during drilling is more difficult than in the case of loss of drilling fluid returns to intergranular permeability. Occasionally the lost circulation recovery materials can be used to prevent loss of the whole fluid to these formations or to recover circulation once it has been lost. In some cases circulation can be re-established in well penetrating formations having these large flow channels by injecting a hydraulic cement into the flow channel and allowing it to set. Recovery of circulation by either method is often impossible, however, because of the inability to bridge the openings with pumpable lost circulation recovery materials and because of the impossibility of filling the flow channels with cement and holding the cement in the channel for sufficient time to permit the cement to set. For these and other reasons the loss of returns in a drilling well is often a serious problem causing considerable expense and in some cases requiring abandonment of an expensive hole.

It is, therefore, an object of this invention to provide an improved procedure and composition for recovering circulation in a drilling well. A more specific object of this invention is to provide a process employing an improved composition for plugging highly permeable zones or caverns in a formation which take whole mud, the composition having initially sufficient plasticity to produce a high angle of repose in such lost circulation zones and to resist movement due to the flow of subterranean waters and eventually to produce a rigid impermeable body which resists displacement when subjected to high drilling fluid pressures. It is still a more specific object of this invention to provide a highly viscous settable mixture in a well when loss of circulation occurs and displace the mixture into the lost circulation zone to plug that zone permanently so that circulation of the drilling fluid in a drilling well can be re-established and that zone will not cause any further loss of drilling fluid. These and other objects of this invention will become apparent from the following description. In this description reference will be made to the accompanying drawing in which:

Figure 1 is a cross-sectional view of a well showing the apparatus and, in part, the process used for producing a highly viscous settable plug in a lost circulation zone penetrated by a well.

In brief, this invention comprises the production of a settable mixture in a well which is too viscous or plastic to be pumped, i. e., passed through a pump, but which can be displaced by surface pumps into a lost circulation zone penetrated by the well. The material is displaced into the lost circulation zone and allowed to set, after which drilling with complete drilling fluid returns may be resumed.

Referring now specifically to the drawing, a well 10 having a protective string of casing 11 has been drilled to a formation 12 which contains a highly permeable lost circulation zone 13. The lost circulation zone may be a fracture, a cavern, a vug, or the like. The permeability of this lost circulation zone is so high that whole drilling fluid is permitted to flow into the formation. That is, the bottom hole pressure within the formation is inadequate to support a full column of drilling fluid in well 10 and, therefore, when drilling fluid is pumped down through drill pipe 14, the level of drilling fluid in the annular space 15 between drill pipe 14 and casing 11 will be lower than the earth's surface—circulation will be lost. When circulation is lost, as is well known, there is always danger of sticking the drill pipe or that the column of drilling fluid in the well will be too light to prevent entry of oil or gas into the well and a blow-out may occur. Accordingly, it is generally considered desirable not only because of the expense from the loss of drilling fluid but because of the other hazards of drilling without circulation of the drilling fluid that circulation be re-established as soon as possible.

Typically, a lost circulation zone occurs at the bottom of a well unless, as for example, the density of the drilling fluid is increased after a weak zone has been passed causing induced fractures which permit loss of the whole drilling fluid. If no such change in the drilling operations has been made, the lost circulation zone is typically assumed to be at the bottom of the well and no survey is made for this zone. If, on the other hand, some change has been made in the drilling procedure as, for example, the addition of weighing material to the drilling fluid or the production of a fracture by rapid lowering of the drill pipe, then it is generally considered desirable first to locate the lost circulation zone before an attempt is made to plug that zone. To locate the lost circulation zone, the drill pipe 14 is withdrawn from the well and a survey made to determine where the drilling fluid is leaving the well. This zone where the drilling fluid is leaving the well may be detected by a number of survey means. For example, permeability surveys and temperature surveys have been found to indicate such zones with ease.

After the lost circulation zone has been located, the drill pipe is again lowered into the well, this time desirably with a mixing sub 16 located at the lower end in place of the bit which has been removed and left at the surface. The mixing sub which may comprise a piece of drill pipe of any length, for example, 10–20 feet, has a number of jets 17 which may be perforations or holes drilled in the periphery for the purpose of jetting fluid pumped through the drill pipe into fluid pumped through the annular space 15 and producing a thorough mixture of the two. The jets may be radial or tangential. Preferably, the jets, which are short ¼–½ inch pipe nipples welded into the sub with the external surfaces flush, have their axes at a slight inclination upwardly from the horizontal.

The number of jets is governed by the cross-sectional area of the jets and the drill pipe, the total cross-sectional area of all jets being substantially less, e. g., 50 percent, than the cross-sectional area of the drill pipe, so as to produce a high velocity jet in the area surrounding the sub. The sub is closed on the bottom by a plug 18. In some cases a jet type bit may produce adequate mixing of the two components so that pulling of the drill pipe to remove the bit and install the jetting sub is unnecessary.

The drill pipe is lowered into the well until the sub is at about the depth of the lost circulation zone 13. In some cases, it is preferred that the mixing sub be placed some distance above the lost circulation zone—from one joint to as much as one or two stands of drill pipe is typical. When the drill pipe has thus been lowered and the sub is in position, the upper end of the drill pipe is connected to the pump 19 either directly as indicated or through the kelly and swivel so that the drill pipe can, if desired, be rotated. Pump 21 which may be the regular rig mud pump having a suction line 22 in the mud pit 23 may be connected to the casing head 24 so that drilling fluid from the mud pit can be injected into the annular space 15. Pump 19 takes suction on fluid in tub 25 via suction line 26. This tub is filled with a slurry of finely divided hydrophilic solids in a hydrophobic or other non-aqueous liquid which is mixed in hopper 27. The non-aqueous liquid is stored in tank 28 and discharged by pump 29 through jet 31 in the hopper to mix the hydrophilic solids and the liquid and produce a non-aqueous liquid slurry of these materials.

The hydrophilic solids used to produce the slurry comprise hydraulic cement and a clay. The clay may comprise any of the various types of water-swelling clay used in the drilling fluid art, but preferably it is a finely ground, e. g., 325 mesh or smaller, bentonitic clay used in the drilling fluid art to produce high gel strength muds. The cement may comprise Portland or gypsum cement or any of the oil well cements. The proportion of cement to clay added to the non-aqueous liquid in hopper 27 may vary from about ½ to about 4 parts cement per 1 part clay by weight. Inasmuch as low cement/clay ratios tend to produce a mixture having a lower tensile strength and inasmuch as a high cement/clay ratio may produce a mixture harder than the formation in which it is placed, an intermediate ratio of cement to clay is generally preferred. The preferred range comprises a ratio of about 1 part cement to 1 part clay by weight. The non-aqueous liquid used to produce the slurry may comprise any liquid which does not effect hydration of the clay or the cement. Alcohols and hydrocarbon liquids, typically crude oil or a refined oil such as gasoline, kerosene, diesel oil, or the like, are preferred. This non-aqueous liquid is, as indicated above, mixed with the solid components of the slurry, clay and cement, in hopper 27 by passing the liquid through jet 31. The ratio of non-aqueous liquid to solids in the slurry may also be varied over a substantial range, but preferably the amount of solids in the liquid is about as high as can be picked up from tub 25 by pump 19. The amount of solids to produce a pumpable slurry has been found to fall in the range of less than about 500 pounds of finely divided solids per barrel of non-aqueous liquid. A range of 300–500 pounds of solids per barrel of liquid is generally satisfactory. Typically, 400 pounds of total solids (200 pounds of finely divided bentonitic clay and 200 pounds of finely divided oil well cement) per barrel of non-aqueous liquid (diesel oil or kerosene) are used. This slurry may then be discharged directly into well 10 near the lost circulation zone 13 through jets 17.

In the preferred operation, a back pressure valve 32 is placed in the bottom of the drill pipe adjacent the mixing sub 16 so that as the drill pipe is lowered into the well with the mixing sub affixed, entry of drilling fluid into the drill pipe is prevented. In case the back pressure valve 32 is not inserted or in some cases even when the back pressure valve is employed, a quantity, typically 3–5 barrels, of the non-aqueous liquid without solids is injected into the drill pipe and displaced to the bottom as a spacer. It is sometimes desirable also to discharge at least a small part of this spacer liquid into the mixing sub and out through jets 17 whereby the non-aqueous liquid slurry of hydrophilic solids which follows is not permitted to come into contact inside the drill pipe or mixing sub with the aqueous liquid. After the spacer liquid has been injected into the drill pipe by, for example, displacing the non-aqueous liquid from tank 28 with pump 29 into tub 25 and there picking it up with pump 19 and pumping it into the drill pipe, the hydrophilic solids are added to the hopper and the drill pipe is filled. An increase in pressure, as indicated by a gage 33, may indicate when the drill pipe has been filled. Alternatively, the amount of non-aqueous liquid hydrophilic solids slurry injected into the drill pipe may be measured and when the calculated volume of the drill pipe plus one or two barrels has been pumped into the well, pumps 19 and 29 may be stopped.

Aqueous liquid may be injected into the well through annulus 15 as the slurry is displaced down the drill pipe; however, pump 21 is preferably not started until the drill pipe is full. Inasmuch as the well at the time circulation is lost is normally filled with aqueous drilling fluid including colloids such as bentonite and starch, it is generally desirable that additional drilling fluid from the mud pit be pumped into the annulus. However, in some cases it is desirable to inject a special aqueous liquid into the annulus to be mixed with the slurry near the lost circulation zone in the well. In this case, a cementing truck or the like may be attached to the casing head 24. In either case, it is generally desirable after the drill pipe has been filled to start pump 21 and to measure either by pump strokes or by other metering devices the amount and rate of aqueous liquid injected into the annulus. The rate of injection of the aqueous liquid into the annulus typically varies from about ½–8 parts by volume of non-aqueous liquid-hydrophilic solids slurry per 1 part by volume of aqueous liquid. The preferred ratio is about 2 volumes of slurry per volume of aqueous liquid.

Where circulation is completely lost, this aqueous liquid may be injected into the annulus until it is full without closing the upper end. The upper end of the annulus is then closed as with a blow-out preventer 34 so that pressure can be applied to the aqueous liquid in the annular space. By the time the aqueous liquid starts moving down in the well past the mixing sub 16, pumps 19 and 29 are started again to jet the slurry in the drill pipe through jets 17 into the moving aqueous liquid stream. The rate of injection of the slurry is desirably high so that the mixing in the area surrounding the mixing sub is violent or turbulent to facilitate a thorough mixture between the slurry and the aqueous liquid. With 4 inch drill pipe and from ten to fifteen ¼ inch pipe jets in the mixing sub, the slurry is injected at the rate of about 1–10 barrels per minute and preferably at a rate in the range 3–5 barrels or more per minute, and the aqueous liquid is injected at the rate of about 1½ to 2 barrels per minute. This ratio, however, may be varied depending somewhat upon the free water in the aqueous liquid, i. e., the water not tied up on the clay in the drilling fluid and available for hydration of the clay and cement in the non-aqueous liquid slurry. Generally, in a drilling fluid having a normal viscosity of about 30–50 centipoises and a weight of about 9–11 pounds per gallon, the water available for hydration of the cement and clay in the slurry appears to be adequate when the ratio of slurry to drilling fluid is about 2 to 1. As the viscosity of the drilling fluid increases, the water available for hydration of the solids in the slurry, of course, decreases so that the ratio of aqueous liquid to slurry should proportionately be increased.

With thorough mixing at the mixing sub, as above described, the clay and cement in the slurry begin to hydrate substantially instantaneously when the slurry contacts the aqueous liquid. That is, the solids in the slurry being preferentially water wet, these materials are immediately wet by the free water in the aqueous liquid which displaces and frees the non-aqueous liquid. Within a few seconds, as indicated by tests at the surface, the viscosity of this mixture rises beyond the range normally measurable on viscosimeters—a viscosity similar to the viscosity of mortar and the like which is, of course, not pumpable but which may be displaced down the well and into the lost circulation zone. Desirably the viscosity or plasticity of this mixture is so high that an angle of repose of about 80–90° can be obtained in caverns and other lost circulation zones.

Injection of both the slurry and the aqueous liquid at these high rates is continued until substantially all of the slurry has been injected into the drill pipe. The volume of this slurry may be varied over a substantial range depending upon the experience in any locality or upon the severity of the loss of fluid to a formation. Generally when caverns are encountered or when the loss of returns has been experienced over a long section in a drilling well, the volume of the slurry and, accordingly, the volume of the mixture is higher than when only a small fractured zone has been encountered. The volume of the slurry may be varied from about 5 to 500 barrels or more, but in the typical operation 50–100 barrels of slurry are preferred, at least for the first stage. If this amount of slurry is inadequate, additional stages of the same or greater amounts may, of course, be employed until a zone which takes the whole drilling fluid has been completely plugged. In any case, it is generally desirable finally to obtain a squeeze pressure if possible. A squeeze when it can be detected in view of the high displacement pressure normally encountered in this process is desirable since it tends to indicate that the cavern, fracture, or other lost circulation zone has been completely filled with the viscous mixture. In some instances, the cavern may be so large that a squeeze pressure cannot be detected when the mixture is being pumped at high rate. This mixture being thixotropic, the viscosity varies inversely as the rate of shear. The rate of injection of the mixture into the lost circulation zone may, therefore, be decreased after substantially all of the slurry has been injected into the well so as to encourage the development of a higher viscosity within the lost circulation zone. The rate of injection may even be reduced to zero intermittently to facilitate a high rate of shear strength build-up and to determine whether the lost circulation zone has been completely filled. When a squeeze pressure is indicated by an increase in pressure or by failure of the formation to take the mixture at a reasonable pressure, the drill pipe is desirably raised two or three stands to remove the mixing sub out of the area in the well which may be contaminated with the mixture so that any danger of sticking the pipe is avoided. In any case, all of the slurry is displaced out of the drill pipe and the mixing sub and out of the annulus with a follower spacer of non-aqueous liquid such as kerosene or crude oil so as to avoid any possibility of sticking the drill pipe in the well. As the drill pipe is withdrawn from the well, the total volume of the drill pipe including contents which is withdrawn from the well is replaced by a volume of aqueous liquid injected through the annulus so that the mixture in the lost circulation zone will not tend to be swabbed or flowed into the well.

This mixture is allowed to remain undisturbed in the well in the adjacent formations and in lost circulation zones until it has taken a set and developed a substantial strength. A tensile strength of at least 10 pounds per square inch or greater is desired so that the plug will not flow or leak when drilling is resumed. The strength of the mixture depends upon the setting time and upon the concentration of the cement in the mixture as well as upon the additives in the drilling fluid which might accelerate or retard the set of the cement, the bottom hole temperature, etc. It has been found, by way of example, that with a slurry of 200 pounds of bentonitic clay, 200 pounds of quick-set cement, and 1 barrel of diesel oil mixed at the rate of 2 volumes of slurry to 1 volume of a typical 40 viscosity drilling fluid, the mixture took an initial set at 80° F. within six hours as indicated by the Vicat needle, i. e., the Vicat needle was supported by the mixture. Within twenty-four hours, the mixture had developed a tensile strength of 35 pounds per square inch. The same mixture at a temperature of 120° F. developed a tensile strength of 15 pounds per square inch within six hours and 50 pounds per square inch within twenty-four hours. When the ratio of the slurry was changed from 2 volumes of slurry containing the same ratio of constituents to 3 volumes of the same aqueous drilling fluid, the mixture did not develop an initial set within six hours at 80° F., but within twenty-four hours a tensile strength of 10 pounds per square inch had developed. At 120° F. the six hour tensile strength of this mixture was 10 pounds per square inch and at twenty-four hours the tensile strength was 20 pounds per square inch. A similar test was conducted in which the total solids in the slurry was maintained constant, but the concentration of the cement was increased. In this case where 2 volumes of slurry containing 50 pounds per barrel of bentonitic clay and 350 pounds per barrel of Portland cement were mixed with 1 volume of ordinary bentonitic drilling fluid, the tensile strength was increased substantially and the initial viscosity at mixing appeared to be in the same range. At a temperature of 80° F. this high cement concentration mixture produced a tensile strength of 20 pounds per square inch within six hours and 70 pounds per square inch within twenty-four hours. At 120° F. the mixture had developed a tensile strength of 40 pounds per square inch within six hours and 80 pounds per square inch within twenty-four hours.

It can be seen from the foregoing data that if the mixture is injected into a lost circulation zone and that if it completely fills that zone, an immovable bridge can be placed in the zone provided the mixture is allowed to set for sufficient time to develop strength. Accordingly, depending upon the experience in the area, the size of a cavern, and the like, the mixture is allowed to set and remain in a quiescent state from about ten hours to about two days or more to develop a set plug which cannot be displaced or broken up when the well is reamed or when drilling is again commenced. In the typical operation, a waiting period of about 20–24 hours is allowed before drilling is resumed.

As an example of the operation of this process in stopping lost circulation in a drilling well, a well in Eddy County, New Mexico, drilling at a depth of 7,997 feet with a bentonitic mud weighing 9 pounds per gallon and having a viscosity of 45 centipoises had a complete loss of drilling fluid returns and the fluid level dropped to a depth of 1,400 feet in the annulus. The hydrostatic head, due to this drilling fluid, was calculated at 3,000 p. s. i. which was in close agreement with the bottom hole pressure observed during a drillstem test when the total depth was 7,990 feet. After the circulation had been lost, large quantities of flaked, fibrous, and granular lost circulation materials were added to the injected drilling fluid stream and displaced down to the bottom of the well in slugs. Circulation could not, however, be recovered by this method, and drilling was continued without returns to a depth of 8,197 feet, 200 feet below the top of the lost circulation zone. The drill pipe was then withdrawn and the bit was replaced by a back pressure valve and a mixing sub in the positions shown on the drawing. The mixing sub had 10 jets of ½ inch diameter directed upward at an angle of about 15° to the radius, and the total area of the jets was about 20 percent of the area of the 4½ inch drill pipe. The drill pipe was lowered until the bottom of the mixing sub was at a depth of about 7,900 feet. The rams in the blow-out preventer were then closed so that a pressure could be applied to the drilling fluid which was injected through the annular space in the well surrounding the drill pipe. A slurry of 200 sacks of quickset cement (94 pounds per sack) and 200 sacks of bentonite (100 pounds per sack) in 100 barrels of diesel oil preceded by 10 barrels of diesel oil as a spacer was injected into the drill pipe at a rate of 5 barrels per minute. After part of the spacer liquid had been displaced through the mixing jets, the drilling fluid was pumped down the annulus at a rate of 2½ barrels per minute. After the injection of drilling fluid into the annulus was started and after the spacer liquid had been displaced from the drill pipe and the hydrophilic solids in the slurry commenced to be mixed with the drilling fluid, the surface or pump pressure on the drilling fluid increased to about 1,000 p. s. i. indicating that the viscous mixture was being displaced down the well and that the annulus had been completely filled. Pumping was continued at about the same rate until all of the slurry had been injected into the drill pipe. Ten barrels of spacer liquid were then injected into the drill pipe to displace the last of slurry into the well. The drill pipe was then raised three stands as drilling fluid was added to the annular space to keep the well full of liquid. After waiting for a period of twenty hours to permit the cement to set and the mixture to develop some tensile strength, the plug was drilled and drilling continued to a depth of about 11,000 feet with full drilling fluid returns. During this period of drilling following the plugging of the lost circulation zone, the mud was treated with various chemicals including quebracho and sodium bicarbonate to overcome the viscosity increasing effects of the bentonite and cement on the mud with no apparent adverse effects on the set cement in the lost circulation zone.

From the foregoing it is manifest that this invention is susceptible of a wide variety of embodiments and that this invention is not limited to the scope of the description which has been given by way of illustration. For example, while the non-aqueous liquid slurry of clay and cement is in the description injected into the well through the drill pipe and the aqueous liquid is injected through the annulus, the reverse procedure might in some cases be preferred. Furthermore, it will be apparent that the clay and cement may be mixed separately in a non-aqueous liquid and that the separate slurries may be mixed with the aqueous liquid either simultaneously or at different times. The invention should be construed, therefore, to be limited only by the scope of the appended claims.

We claim:

1. A process for the recovery of circulation in a drilling well that penetrates a formation which takes whole mud comprising intimately mixing within said well a non-aqueous liquid slurry of finely divided hydraulic cement and clay with an aqueous liquid, the concentration of said clay in said non-aqueous liquid slurry being great enough to produce a mixture too viscous to pump and displacing at least a part of said mixture into said formation.

2. A process according to claim 1 wherein the volume of said slurry is in the range of about ½–8 times the volume of said aqueous liquid.

3. A process according to claim 2 wherein said clay is bentonite and the concentration of said cement and clay in said slurry is in the range of about 300–500 pounds per barrel of said non-aqueous liquid.

4. A process according to claim 3 wherein the ratio of said cement to said clay is in the range of about ½–4 parts by weight of cement per part of clay.

5. A process for the recovery of circulation in a drilling well that penetrates a formation which takes whole mud comprising pumping between about ½ and about 8 parts by volume of a non-aqueous liquid slurry of finely divided hydraulic cement and clay into the bottom of a well and intimately mixing with said slurry in said well substantially at the elevation of said formation 1 part by volume of an aqueous liquid, the concentration of said clay in said non-aqueous liquid slurry being great enough to produce a mixture too viscous to pump and displacing at least a part of said mixture into said formation.

6. A process according to claim 5 wherein said clay is bentonite and the concentration of said cement and clay in said slurry is in the range of about 300–500 pounds per barrel of said non-aqueous liquid.

7. A process according to claim 6 wherein the ratio of said non-aqueous liquid slurry to said aqueous liquid injected into said well is about 2 parts by volume of slurry per 1 part of aqueous liquid.

8. A method of producing a viscous settable plug in a well comprising injecting into said well through a first conduit between about ½ and 8 volumes of a non-aqueous liquid slurry of finely divided hydraulic cement and clay, said cement and clay being in the range of 300–500 pounds total per barrel of said non-aqueous liquid, and introducing into said well through a second conduit one volume of an aqueous liquid the ratio of said cement in said clay being in the range of about ½–4 to 1 whereby when said slurry and said aqueous liquid are intimately comingled in said well, a mixture too viscous to pump is produced.

9. A method according to claim 8 wherein said slurry is jetted into a moving stream of said aqueous liquid in said well to produce thorough mixing and rapid increase in viscosity of the mixture.

10. In a process of recovering lost circulation in a drilling well including simultaneously injecting a non-aqueous liquid slurry of finely divided bentonite into a well through a first conduit and an aqueous drilling fluid through a second conduit, and intimately mixing said slurry and said drilling fluid within said well near the lost circulation zone to produce a plastic plug, the ratio of said finely-divided bentonite to said drilling fluid being high enough that said plastic plug is too viscous to pump, the improvement comprising adding between about ½ and about 4 parts by weight of finely divided hydraulic cement per 1 part of said bentonite to said slurry to produce a settable plug.

References Cited in the file of this patent

UNITED STATES PATENTS

| | | |
|---|---|---|
| 1,092,933 | Meade | Apr. 14, 1914 |
| 2,146,480 | Kennedy | Feb. 7, 1939 |
| 2,259,875 | Bent et al. | Oct. 21, 1941 |
| 2,379,516 | Garrison | July 3, 1945 |

OTHER REFERENCES

"Lost-Circulation Materials and Mud Additives," Roy F. Carlson, The Oil and Gas Journal, December 28, 1950, pages 64, 66, and 67.

"Lost Circulation-Causes and Remedies," H. J. Shumate, The Petroleum Engineer, November 1951, pages B-81, B-84, and B-86.